US011652394B2

(12) United States Patent
Olien et al.

(10) Patent No.: US 11,652,394 B2
(45) Date of Patent: May 16, 2023

(54) HAPTIC SOLENOID ASSEMBLY WITH A SOLENOID VIBRATION-DAMPING SYSTEM

(71) Applicant: INNOVOBOT INC., Westmount (CA)

(72) Inventors: Neil Olien, Quebec (CA); Robert Paul Gregorio, Quebec (CA)

(73) Assignee: INNOVOBOT INC., Westmount (CA)

( * ) Notice: Subject to any disclaimer, the term of this patent is extended or adjusted under 35 U.S.C. 154(b) by 733 days.

(21) Appl. No.: 16/692,366

(22) Filed: Nov. 22, 2019

(65) Prior Publication Data

US 2020/0169155 A1 May 28, 2020

Related U.S. Application Data

(60) Provisional application No. 62/770,797, filed on Nov. 22, 2018.

(51) Int. Cl.
*H02K 33/16* (2006.01)
*B06B 1/04* (2006.01)
(Continued)

(52) U.S. Cl.
CPC ............. *H02K 33/16* (2013.01); *H02K 5/225* (2013.01); *B06B 1/045* (2013.01); *G06F 3/016* (2013.01); *H01H 2215/05* (2013.01)

(58) Field of Classification Search
CPC ...... H02K 7/065; H02K 7/075; H02K 7/1884; H02K 7/1876; H02K 33/00; H02K 33/02;
(Continued)

(56) References Cited

U.S. PATENT DOCUMENTS 3,508,316 A * 4/1970 Hill ...................... H02K 15/068
29/605
3,591,815 A * 7/1971 Grootenhuis ............ G01H 1/10
310/27
(Continued)

FOREIGN PATENT DOCUMENTS

DE 3707600 A * 9/1988 ............ F16C 27/063

OTHER PUBLICATIONS

Hoffmann, machine translation of de3707600, Sep. 1998 (Year: 1998).*
(Continued)

*Primary Examiner* — Eric Johnson
(74) *Attorney, Agent, or Firm* — Kutak Rock LLP

(57) ABSTRACT

The present disclosure concerns a haptic solenoid assembly for transmission of amplified vibrations to a vibrated member, the haptic solenoid assembly comprising a stationary pole comprising a casing defining a plunger-receiving cavity opening out in the casing and a coil at least partially surrounding the plunger-receiving cavity; a mobile pole comprising a mobile pole body at least partially received in the plunger-receiving cavity and displaceable therein when an electric current is provided to the coil; and a lever-mounting portion protruding outwardly from the plunger-receiving cavity and engageable to the vibrated member; and a solenoid vibration-damping system engaged to the stationary pole and at least partially surrounding the plunger-receiving cavity. The present disclosure also concerns a haptic solenoid system comprising a haptic solenoid assembly and a vibration-transmitting member connected to the lever-mounting end portion of the mobile pole and engageable to the vibrated member.

20 Claims, 7 Drawing Sheets

(51) Int. Cl.
*G06F 3/01* (2006.01)
*H02K 5/22* (2006.01)

(58) Field of Classification Search
CPC ........ H02K 33/04; H02K 33/06; H02K 33/08; H02K 33/10; H02K 5/1672; H02K 5/1675; H02K 7/083; H02K 7/085; B06B 1/04; B06B 1/045; G06F 3/016; H01F 2007/163
See application file for complete search history.

(56) References Cited

U.S. PATENT DOCUMENTS

| | | | |
|---|---|---|---|
| 7,825,903 | B2 | 11/2010 | Anastas et al. |
| 8,072,317 | B2 | 12/2011 | Sproelich et al. |
| 8,502,792 | B2 | 8/2013 | Anastas et al. |
| 8,629,954 | B2 | 1/2014 | Olien et al. |
| 9,304,589 | B2 | 4/2016 | Sawaguchi |
| 9,358,689 | B2 | 6/2016 | Ramsay et al. |
| 9,466,783 | B2 | 10/2016 | Olien et al. |
| 9,529,435 | B2 | 12/2016 | Levesque et al. |
| 9,684,375 | B2 | 6/2017 | Olien |
| 9,696,806 | B2 | 7/2017 | Modarres et al. |
| 9,729,730 | B2 | 8/2017 | Levesque et al. |
| 9,827,904 | B2 | 11/2017 | Modarres et al. |
| 9,959,714 | B2 | 5/2018 | Ramsay et al. |
| 10,019,875 | B1 | 7/2018 | Alghooneh et al. |
| 10,232,773 | B2 | 3/2019 | Modarres et al. |
| 10,275,032 | B2 | 4/2019 | Olien et al. |
| 10,303,253 | B2 | 5/2019 | Khoshkava et al. |
| 10,338,681 | B2 | 7/2019 | Modarres et al. |
| 10,404,149 | B2 | 9/2019 | Khoshkava et al. |
| 10,445,994 | B2 | 10/2019 | Ramsay et al. |
| 10,564,725 | B2 | 2/2020 | Alghooneh et al. |
| 2011/0141052 | A1* | 6/2011 | Bernstein ................ G06F 3/041 341/5 |

OTHER PUBLICATIONS

Baird, How Do Levers Create Energy If the Xoncedrvation of Energy Does Not Allow Energy to Be Created?, from www.wtamu.edu, Apr. 2, 2013, (Year: 2013).*

* cited by examiner

HAPTIC SOLENOID ASSEMBLY WITH A SOLENOID VIBRATION-DAMPING SYSTEM

PRIOR APPLICATION

The present application claims priority from U.S. provisional patent application No. 62/770,797, filed on Nov. 22, 2018, and entitled "SOLENOID AND SOLENOID ASSEMBLY", the disclosure of which being hereby incorporated by reference in its entirety.

TECHNICAL FIELD

The present description relates to a haptic solenoid assembly for transmission of amplified vibrations to a vibrated member, such as a monitor or display screen, for instance to provide haptic feedback to a user when the user interacts with a touch surface, for example when a virtual button is depressed on a touch screen. The present description also relates to a haptic solenoid system.

BACKGROUND

Touchscreens, touch pads and single piece button panels (such as and without being limitative capacitive, infrared sensing or other touch sensitive technology) are more and more used in vehicles such as cars but might sometimes not be fully satisfactory since such screens lack a physical response when a virtual button is depressed. Solenoids—usually referred to as haptic solenoids—might be used to provide haptic feedbacks to the user but their structures are often inefficient or ineffective—especially when the solenoid is directly coupled to a screen to be actuated—and/or their actuation generates noises, such as rattling—for instance when a lever is used to couple the solenoid with the screen to be actuated.

In view of the above, there is a need for a haptic solenoid assembly and a haptic solenoid system which would be able to overcome or otherwise reduce some of the above-discussed prior art concerns.

BRIEF SUMMARY

It is therefore an aim of the present invention to address the above-mentioned issues.

According to a general aspect, there is provided a haptic solenoid assembly for transmission of amplified vibrations to a vibrated member, the haptic solenoid assembly comprising: a stationary pole comprising a casing defining a plunger-receiving cavity opening out in the casing and a coil at least partially surrounding the plunger-receiving cavity; a mobile pole comprising: a mobile pole body at least partially received in the plunger-receiving cavity and displaceable therein when an electric current is provided to the coil; and a lever-mounting portion protruding outwardly from the plunger-receiving cavity and engageable to the vibrated member; and a solenoid vibration-damping system engaged to the stationary pole and at least partially surrounding the plunger-receiving cavity.

According to another general aspect, there is provided a haptic solenoid assembly for transmission of amplified vibrations to a vibrated member, the haptic solenoid assembly comprising: a solenoid barrel forming a stationary pole and comprising: a casing defining a plunger-receiving cavity opening out in the casing; and a coil at least partially surrounding the plunger-receiving cavity; a mobile pole comprising: a plunger body at least partially received in the plunger-receiving cavity and displaceable therein when an electric current is provided to the coil, and a lever-mounting portion protruding from the plunger body outwardly from the plunger-receiving cavity and engageable to the vibrated member; and a plunger-guiding bushing engaged to an outer surface of the casing and having a plunger-receiving aperture formed therethrough and being in register with the plunger-receiving cavity of the solenoid barrel.

According to another general aspect, there is provided a haptic solenoid assembly for transmission of amplified vibrations to a vibrated member, the haptic solenoid assembly comprising: a stationary pole comprising: a casing defining a plunger-receiving cavity opening out in the casing, and a coil at least partially surrounding the plunger-receiving cavity; a mobile pole comprising: a mobile pole body extending at least partially in the plunger-receiving cavity and displaceable therein when an electric current is provided to the coil, and a lever-mounting portion protruding outwardly from the plunger-receiving cavity; and a vibration-transmitting lever comprising: a solenoid-mounting end portion pivotably mounted to the lever-mounting portion of the mobile pole about a first pivot axis; and an opposed vibrating end portion engageable to the vibrated member.

According to another general aspect, there is provided a haptic solenoid system comprising: a haptic solenoid assembly according to the present disclosure; and a vibration-transmitting member connected to the lever-mounting end portion of the mobile pole and engageable to the vibrated member.

According to another general aspect, there is provided a solenoid comprising a barrel and a plunger assembly. The barrel comprises a housing having bottom and top walls and a peripheral wall extending therebetween and defining together a plunger-receiving cavity opening out in the top wall, and a coil mounted to the peripheral wall around the plunger-receiving cavity. The plunger assembly comprises a plunger body extending in the plunger-receiving cavity and displaceable therein when an electric current is provided to the coil, and a lever-mounting end portion protruding from the plunger body outwardly from the plunger-receiving cavity. The solenoid further comprises a guiding bushing engaged with the top wall outwardly from the plunger-receiving cavity and having a plunger-receiving aperture formed therein extending in registry with the plunger-receiving cavity of the barrel. The plunger-receiving aperture has an inner cross-section smaller than an inner cross-section of the plunger-receiving cavity. The guiding bushing may be made of a material having low or reduced friction properties, such as, without being limitative, Teflon or brass.

According to another general aspect, there is provided a solenoid comprising a barrel and a plunger assembly. The barrel comprises a housing having bottom and top walls and a peripheral wall extending therebetween and defining together a plunger-receiving cavity opening out in the top wall, and a coil mounted to the peripheral wall around the plunger-receiving cavity. The plunger assembly comprises a plunger body extending in the plunger-receiving cavity and displaceable therein when an electric current is provided to the coil, and a lever-File mounting end portion protruding from the plunger body outwardly from the plunger-receiving cavity. The solenoid further comprises a solenoid vibration damping system engaged with the top wall outwardly from the plunger-receiving cavity and surrounding the plunger-receiving cavity.

In one feature, the solenoid vibration damping system comprises a guiding bushing engaged with the top wall outwardly from the plunger-receiving cavity and having a plunger-receiving aperture formed therein extending in registry with the plunger-receiving cavity of the barrel. The plunger-receiving aperture of the guiding bushing has an inner cross-section smaller than an inner cross-section of the plunger-receiving cavity.

In one feature, the solenoid vibration damping system further comprises a solenoid vibration damping with a bushing-receiving aperture formed therein. The solenoid vibration damping is engaged with the top wall outwardly from the plunger-receiving cavity and surrounds the plunger-receiving cavity. The guiding bushing is snugly fitted into the bushing-receiving cavity of the solenoid vibration damper.

According to another general aspect, there is provided a solenoid assembly comprising a barrel and a plunger assembly. The barrel comprises a housing having bottom and top walls and a peripheral wall extending therebetween and defining together a plunger-receiving cavity opening out in the top wall, and a coil mounted to the peripheral wall around the plunger-receiving cavity. The plunger assembly comprises a plunger body extending in the plunger-receiving cavity and displaceable therein when an electric current is provided to the coil, and a lever-mounting end portion protruding from the plunger body outwardly from the plunger-receiving cavity. The solenoid assembly further comprises a lever comprising a solenoid-mounting end portion pivotably mounted to the lever-mounting end portion about a first pivot axis and an opposed vibrating end portion engageable to a mobile piece and pivotably mounted to a fixed piece about a second pivot axis. The solenoid assembly also comprises one or more vibration dampers in the vicinity of the first and second pivot axes.

In one feature, the one or more vibration dampers are made of a material having flexibility and/or resilience and/or damping properties, such as, without being limitative, rubber, silicon or neoprene.

In one feature, the one or more vibration dampers comprise one or more lever vibration dampers in the vicinity of the second pivot axis.

In another feature, the one or more vibration dampers comprise a solenoid vibration damper proximate the first pivot axis.

Other objects, advantages and features of the present invention will become more apparent upon reading of the following non-restrictive description of illustrative embodiments thereof, given by way of example only with reference to the accompanying drawings.

BRIEF DESCRIPTION OF THE DRAWINGS

Having thus generally described the nature of the invention, reference will now be made to the accompanying drawings, showing by way of illustration an illustrative embodiment thereof, and in which.

DESCRIPTION OF EMBODIMENTS

Figure 1:
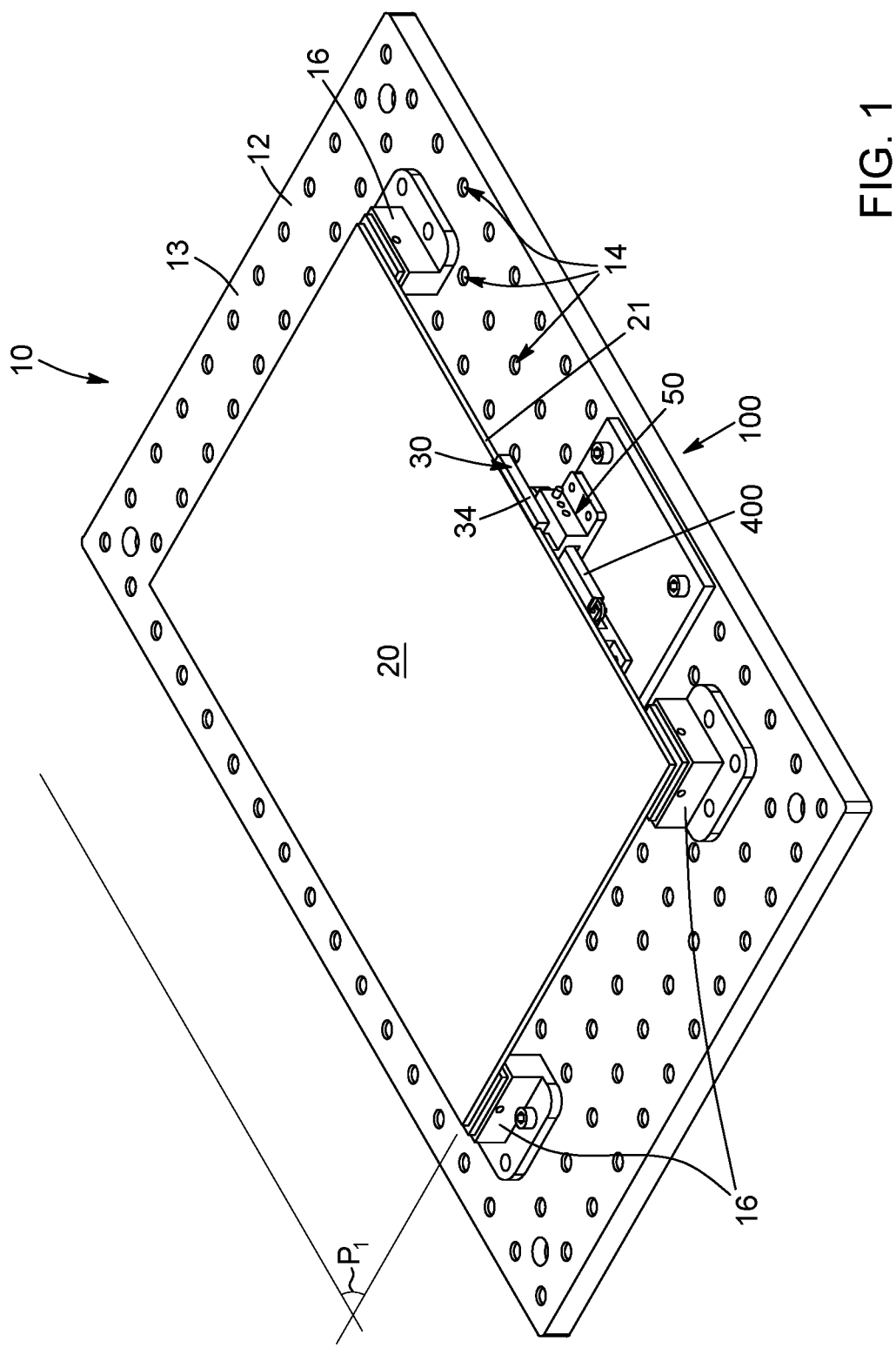
FIG. 1 is a top perspective view of a haptic solenoid system comprising a haptic solenoid assembly in accordance with an embodiment, the haptic solenoid assembly comprising mobile and stationary poles and a vibration-transmitting lever engaged to a vibrated member.

In the following description, the same numerical references refer to similar elements. Furthermore, for the sake of simplicity and clarity, namely so as to not unduly burden the figures with several references numbers, not all figures contain references to all the components and features, and references to some components and features may be found in only one figure, and components and features of the present disclosure which are illustrated in other figures can be easily inferred therefrom. The embodiments, geometrical configurations, materials mentioned and/or dimensions shown in the figures are optional and are given for exemplification purposes only.

Moreover, it will be appreciated that positional descriptions such as "above", "below", "forward", "rearward" "left", "right" and the like should, unless otherwise indicated, be taken in the context of the figures and correspond to the position and orientation of the haptic solenoid system and corresponding parts thereof when being mounted to a solenoid-mounting structure. Positional descriptions should not be considered limiting.

To provide a more concise description, some of the quantitative expressions given herein may be qualified with the term "about". It is understood that whether the term "about" is used explicitly or not, every quantity given herein is meant to refer to an actual given value, and it is also meant to refer to the approximation to such given value that would reasonably be inferred based on the ordinary skill in the art, including approximations due to the experimental and/or measurement conditions for such given value.

In the following description, the term "about" means within an acceptable error range for the particular value as determined by one of ordinary skill in the art, which will depend in part on how the value is measured or determined, i.e. the limitations of the measurement system. It is commonly accepted that a 10% precision measure is acceptable and encompasses the term "about".

In the present description, an embodiment is an example or implementation of the invention. The various appearances of "one embodiment," "an embodiment" or "some embodiments" do not necessarily all refer to the same embodiments. Although various features of the invention may be described in the context of a single embodiment, the features may also be provided separately or in any suitable combination. Conversely, although the invention may be described herein in the context of separate embodiments for clarity, the invention may also be implemented in a single embodiment.

Reference in the specification to "some embodiments", "an embodiment", "one embodiment" or "other embodiments" means that a particular feature, structure, or characteristic described in connection with the embodiments is included in at least some embodiments, but not necessarily all embodiments, of the inventions.

It is to be understood that the phraseology and terminology employed herein is not to be construed as limiting and is for descriptive purposes only. The principles and uses of the teachings of the present invention may be better understood with reference to the accompanying description, figures and examples. It is to be understood that the details set forth herein do not construe a limitation to an application of the invention. Furthermore, it is to be understood that the invention can be carried out or practiced in various ways and that the invention can be implemented in embodiments other than the ones outlined in the description above.

It is to be understood that the terms "including", "comprising", and grammatical variants thereof do not preclude the addition of one or more components, features, steps, or integers or groups thereof and that the terms are to be construed as specifying components, features, steps or integers.

If the specification or claims refer to "an additional" element, that does not preclude there being more than one of the additional element. It is to be understood that where the claims or specification refer to "a" or "an" element, such reference is not to be construed as limited to only one of that element. It is to be understood that where the specification states that a component, feature, structure, or characteristic "may", "might", "can" or "could" be included, that particular component, feature, structure, or characteristic is not required to be included.

Methods of the present invention may be implemented by performing or completing manually, automatically, or a combination thereof, selected steps or tasks. The term "method" may refer to manners, means, techniques and procedures for accomplishing a given task including, but not limited to, those manners, means, techniques and procedures either known to, or readily developed from known manners, means, techniques and procedures by practitioners of the art to which the invention belongs.

The descriptions, examples, methods and materials presented in the claims and the specification are not to be construed as limiting but rather as illustrative only.

Meanings of technical and scientific terms used herein are to be commonly understood as by one of ordinary skill in the art to which the invention belongs, unless otherwise defined. The present invention may be implemented in the testing or practice with methods and materials equivalent or similar to those described herein.

With reference to FIG. 1, there is shown a mounting structure 10 (or solenoid-mounting structure 10), comprising for instance a mounting plate 12 (or solenoid-mounting plate 12), with a plurality of mounting apertures 14 (solenoid-mounting apertures 14) formed therein (opening out in an upper face 13 of the mounting plate 12). The solenoid-mounting structure 10 further comprises a plurality of vibrated member bearings 16 (or screen bearings 16, or touch screen bearings 16), for instance protruding upwardly from the solenoid-mounting plate 12 (from the upper face 13 thereof, in the embodiment shown) and secured to some of the mounting apertures 14. The vibrated member bearings 16 support a mobile piece 20 (or vibrated member 20) displaceable (for instance vibrable and/or translatable, in the embodiment shown) with regards to the solenoid-mounting plate 12.

The mobile piece 20 (or vibrated member 20) might be all or part of a touch screen or a touch pad or a touch-sensor type panel or a touch sensitive sensor, for instance used in a vehicle, such as a car, for instance as an input device. It is however understood that the present disclosure is not limited to such touch screens or touch pads. In the embodiment shown, as represented in FIG. 1, the vibrated member 20 is substantially planar and defines a first plane P1 and is displaceable with regards to the solenoid-mounting plate 12 in a plane substantially parallel to the first plane P1. In the embodiment shown, the mobile piece 20 extends substantially parallel to the mounting plate 12 (at least to a portion thereof, for instance substantially parallel to the upper face 13 of the mounting plate 12) of the solenoid-mounting structure 10.

It is appreciated that the shape and the configuration of the vibrated member 20 and the solenoid-mounting structure 10 can vary from the embodiment shown.

There is further shown a haptic solenoid system 100 mounted (either removably or permanently) to the solenoid-mounting structure 10 (to the upper surface 13 of the solenoid-mounting plate 12, in the embodiment shown) and configured to displace the vibrated member 20 with regards to the mounting plate 12 and/or to vibrate the vibrated member 20.

Figure 2:
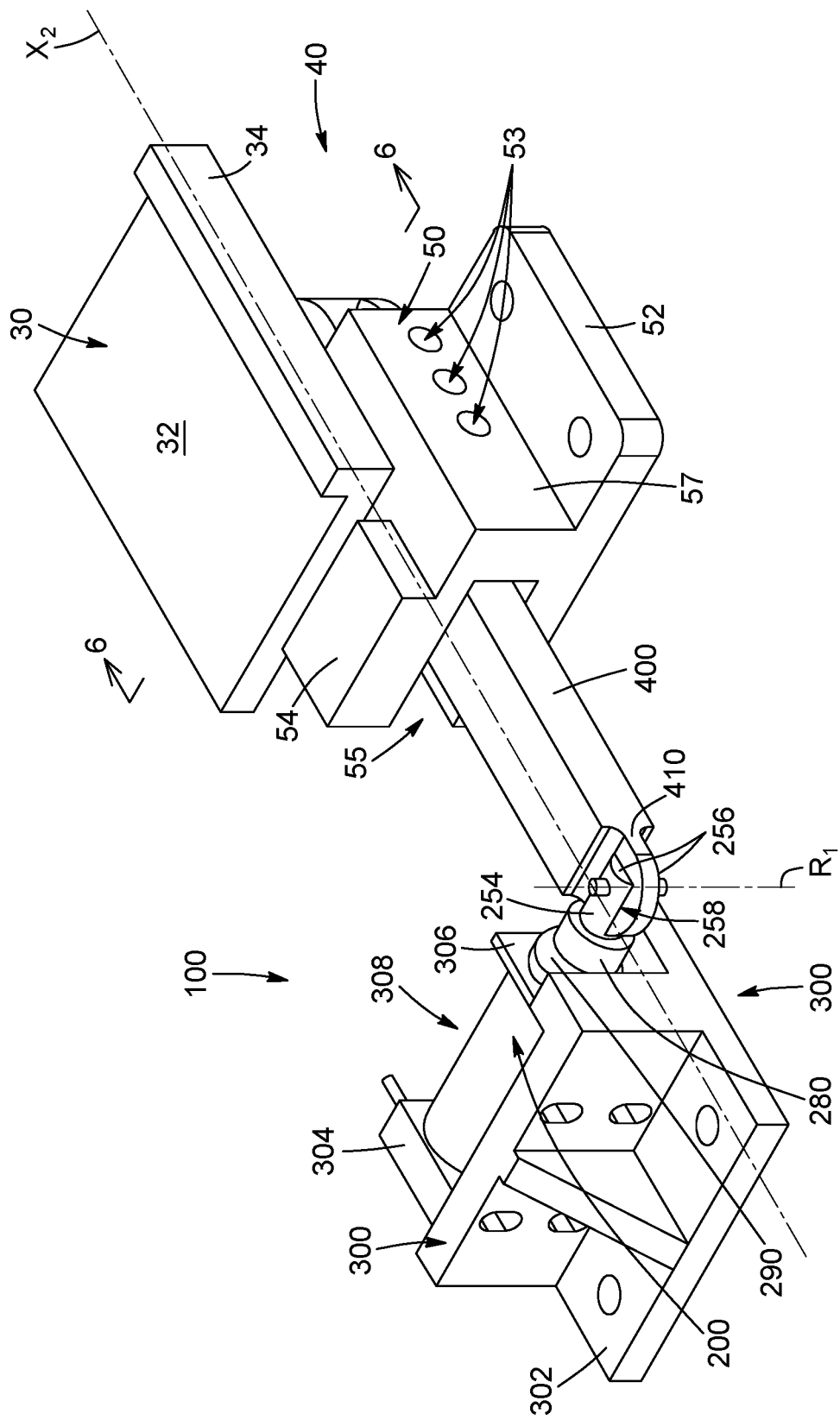
FIG. 2 is an enlarged perspective view of the haptic solenoid system of FIG. 1, the vibrated member being removed.
Figure 3:
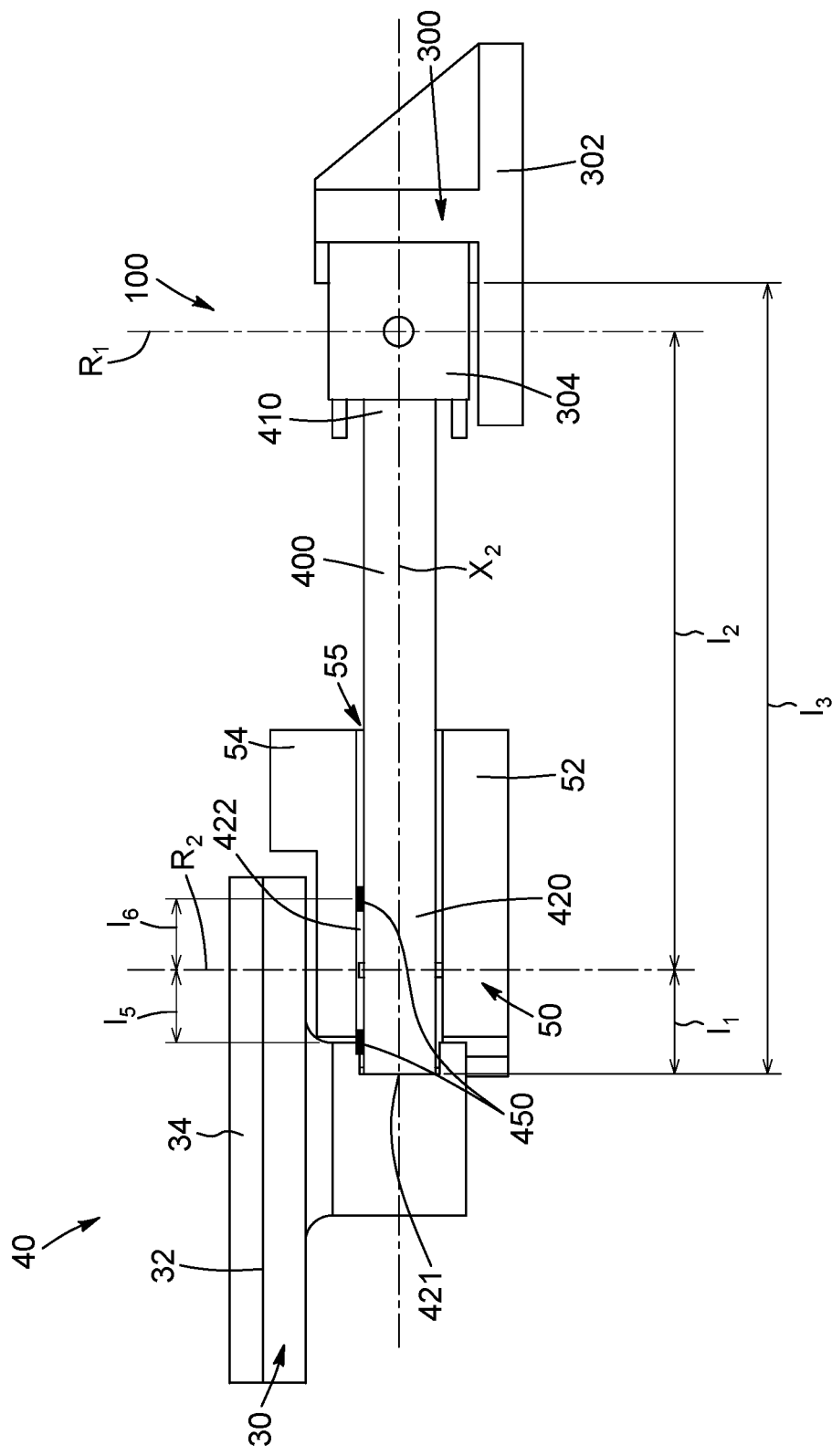
FIG. 3 is a side elevation view of the haptic solenoid system of FIG. 2.

As represented in FIGS. 2 and 3, the haptic solenoid system 100 comprises a haptic solenoid assembly 200 and a solenoid-mounting support 300 to mount the haptic solenoid assembly 200 to the solenoid-mounting plate 12. The haptic solenoid assembly 200 comprises a lever 400 (or a vibration-transmitting lever 400) for applying movements upon actuation of the haptic solenoid assembly 200 to the vibrated member 20. As detailed below, the haptic solenoid system 100 further comprises a vibration-transmitting member 40 engageable to both the vibration-transmitting lever 400 and the vibrated member 20. The vibration-transmitting member 40 comprises a screen-driving member 30 engageable to the vibrated member 20 and a lever-mounting support 50 mountable to the solenoid-mounting structure 10.

Haptic Solenoid Assembly

Figure 4:
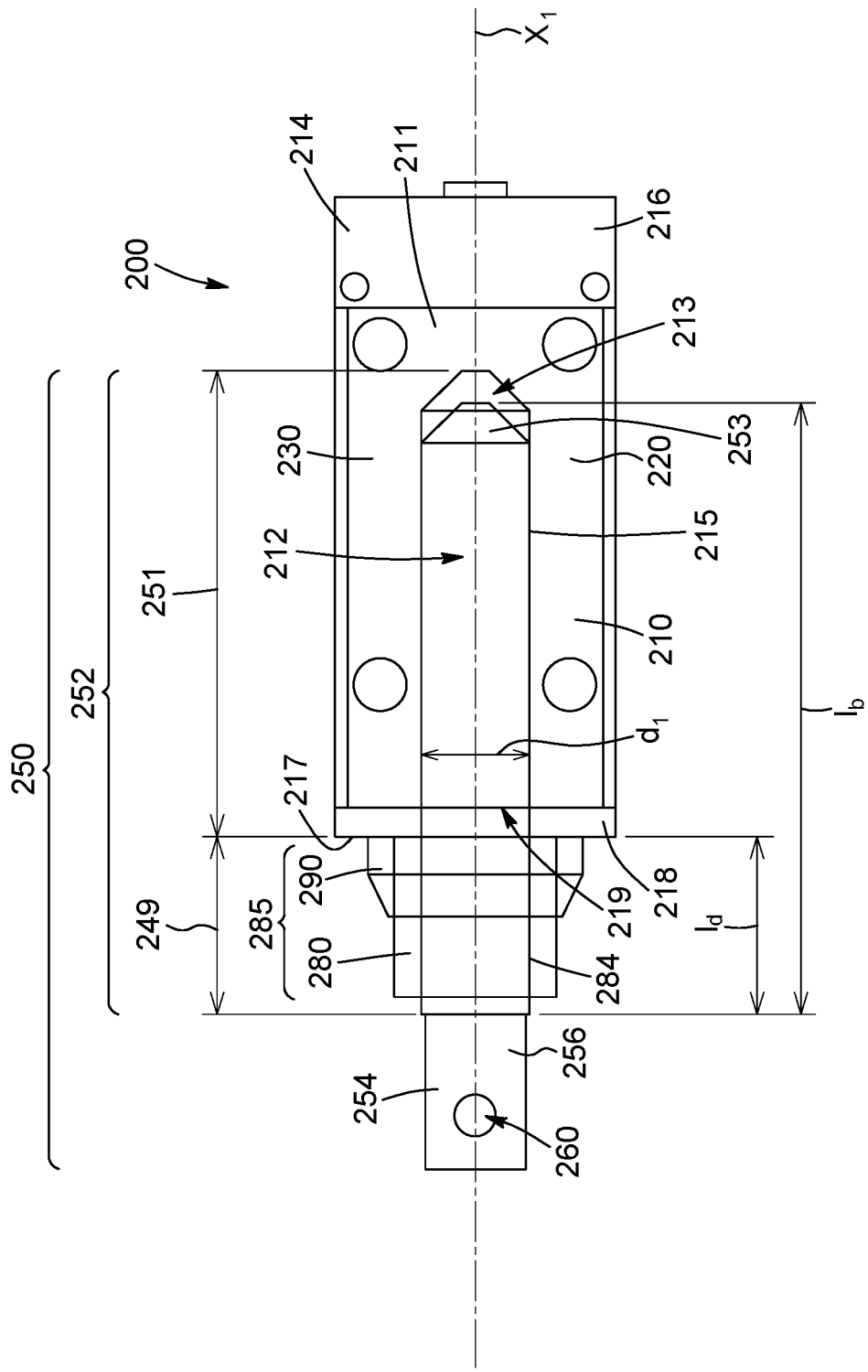
FIG. 4 is a top elevation view of the haptic solenoid assembly of FIG. 1, the vibration-transmitting lever being removed.
Figure 5:
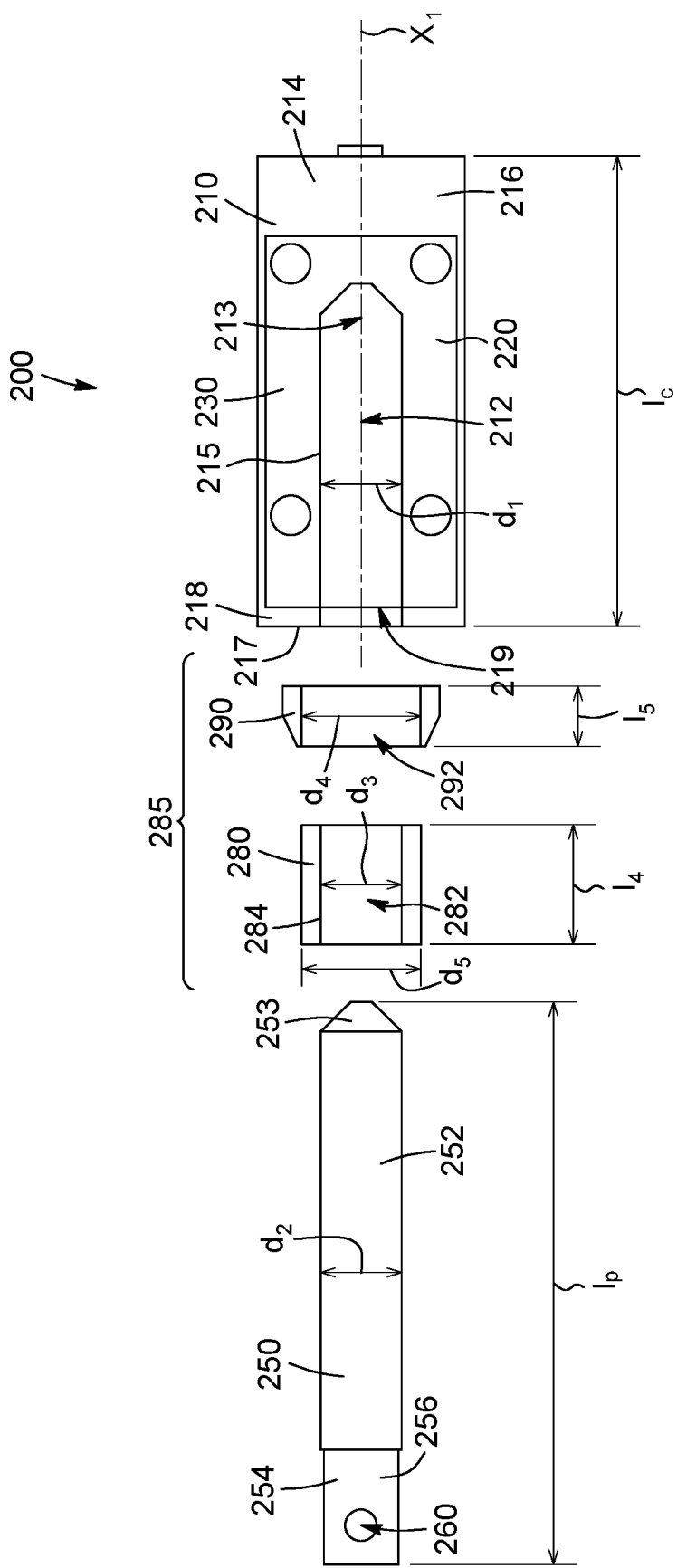
FIG. 5 is a top elevation view, exploded, of the haptic solenoid assembly of FIG. 4.
Figure 6:
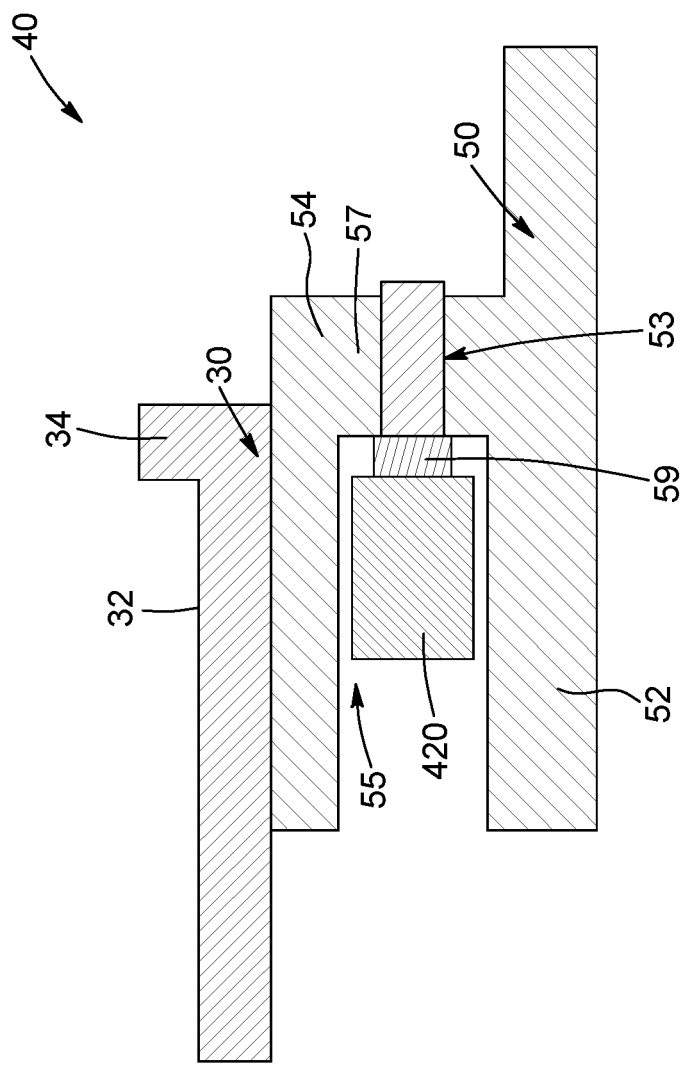
FIG. 6 is a cross-section view of a vibration-transmitting member of the haptic solenoid system of FIG. 1.

In the embodiment shown, and as represented for instance in FIGS. 4 and 5, the haptic solenoid assembly 200 comprises a barrel 210 (or stationary pole 210 or fixed solenoid member 210) with a plunger-receiving cavity 212 (or mobile-pole receiving cavity 212) formed therein, and a plunger assembly 250 (or mobile pole 250 or movable solenoid member 250) partially received in the plunger-receiving cavity 212.

Solenoid Stationary Pole/Haptic Solenoid Barrel

In the embodiment shown, the stationary pole 210 comprises a housing 214 (or casing 214) comprising a bottom wall 216, an opposed top wall 218, extending for instance substantially parallel to the bottom wall 216, and a peripheral wall 220 extending between the top and bottom walls 218, 216. As represented in FIG. 4, the housing 214 comprises a bottom pin 211 (or bottom post 211) protruding inwardly (with respect to the plunger-receiving cavity 212) from the bottom wall 216 so that the plunger-receiving cavity 212 has a substantially non-flat bottom portion 213. The bottom wall 216, the bottom pin 211, the top wall 218 and the peripheral wall 220 at least partially define together—i.e. at least partially delimit together—the plunger-receiving cavity 212 (or mobile pole-receiving cavity 212). It should be understood that the term "mobile" in the expression "mobile pole-receiving cavity" refers to the pole (i.e. the mobile pole) which is received in the cavity. In other words, the casing 214 at least partially defines the mobile pole-receiving cavity 212. The mobile pole-receiving cavity 212 opens out in the casing 214 (in the embodiment shown, the plunger-receiving cavity 212 opens out in the top wall 218 of the casing 214).

For instance, the plunger-receiving cavity 212 (or mobile pole-receiving cavity 212) may be substantially cylindrical and extends along a first longitudinal axis X1 and defines an inner diameter d1. A substantially circular plunger-receiving aperture 219 (or mobile pole-receiving aperture 219 or mobile pole-receiving through opening 219) is thus formed in the casing 214 (for instance in the top wall 218 thereof, in the embodiment shown). In the embodiment shown, the plunger-receiving cavity 212 comprises the bottom portion 213 having a substantially tapered shape, proximate the bottom wall 216, at least partially delimited by the above-mentioned bottom post 211. As represented in FIGS. 4 and 5, apart from the bottom portion 213, the first inner diameter d1 (or first inner cross-section d1) of the plunger-receiving cavity 212 is substantially constant along the first longitudinal axis X1 between the top wall 218 and the bottom portion 213.

In the embodiment shown, the terms bottom and top should be understood with regards to the bottom portion 213 of the mobile pole-receiving cavity 212. The terms proximal and distal could alternatively be used, referring to the position of the walls with regards to the mobile pole-receiving through opening 219 formed in the casing 214 of the stationary pole 210.

The solenoid barrel 210—or solenoid stationary pole 210—further comprises a coil 230 for instance wound with a helical pattern and mounted (directly or indirectly) to—or embedded within—the peripheral wall 220 around the plunger-receiving cavity 212. In the embodiment shown, the bottom pin 211 is at least partially surrounded by the coil 230. In other words, the stationary pole 210 is wrapped with the coil 230 and the coil 230 surrounds at least partially the mobile pole-receiving cavity 212. In yet other words, the coil 230 forms a winding mounted to the stationary pole 210 of the haptic solenoid assembly 200. The coil 230 is configured to generate a magnetic force along the first longitudinal axis X1 of the plunger-receiving cavity 212 when the coil 230 is provided with an electric current, according to Ampere's Law as well known in the art, the magnetic force pulling the mobile pole 250 towards the bottom portion 213 of the plunger-receiving cavity 212. In the following description, the providing of an electric current to the coil 230 of the stationary pole 210 will be referred to as the actuation of the haptic solenoid assembly 200. The generated magnetic field can therefore displace the plunger assembly 250 (or mobile pole 250) substantially longitudinally within the plunger-receiving cavity 212 along a direction substantially parallel to the first longitudinal axis X1.

For instance, the haptic solenoid assembly 200 is configured to displace the plunger assembly 250—or mobile pole 250—at a frequency comprised between about 50 Hz and about 350 Hz. In another embodiment, the haptic solenoid assembly 200 is configured to displace the plunger assembly 250 at a frequency comprised between about 100 Hz and about 300 Hz. In another embodiment, the haptic solenoid assembly 200 is configured to displace the plunger assembly 250 at a frequency comprised between about 100 Hz and about 200 Hz. In yet another embodiment, the haptic solenoid assembly 200 is configured to displace the plunger assembly 250 at a frequency comprised between about 140 Hz and about 160 Hz.

It is appreciated that the shape and the configuration of the barrel 210 (or solenoid stationary pole 210), as well as the shape of the plunger-receiving cavity 212 (or mobile pole-receiving cavity 212) defined by the casing 214 and the location of the coil 230 with regards to the housing 214 of the barrel 210 can vary from the embodiment shown.

Solenoid Mobile Pole—Solenoid Plunger Assembly

In the embodiment shown, the plunger assembly 250 (or solenoid mobile pole 250), as represented for instance in FIGS. 4 and 5, extends along a longitudinal direction and comprises a plunger body 252 (or mobile pole body 252) and a lever-mounting portion 254 protruding from the plunger body 252 (or mobile pole body 252). The longitudinal direction of the plunger assembly 250 substantially corresponds to the first longitudinal axis X1 of the plunger-receiving cavity 212 (or mobile pole-receiving cavity 212) when the plunger assembly 250 is at least partially received therein (i.e. at least partially extends therein) when no electric current is provided to the coil 230.

The plunger body 252 (or mobile pole body 252) is dimensioned to extend at least partially in the plunger-receiving cavity 212 and is displaceable therein when an electric current is provided to the coil 230 (i.e. upon actuation of the haptic solenoid assembly 200). In the embodiment shown, the plunger body 252 is substantially cylindrical and has an outer diameter d2 (i.e. has a substantially circular cross-section). It could also be conceived a plunger body—and a corresponding mobile pole-receiving cavity of a stationary pole—having a non-circular cross-section, such as, for instance, a square or rectangular cross-section. The outer diameter d2 (or outer cross-section d2) of the plunger body 252 is slightly smaller than the inner diameter d1 of the plunger-receiving cavity 212 so that the plunger body 252 can be substantially translated in the plunger-receiving cavity 212 substantially along the first longitudinal axis X1. Moreover, the plunger body 252 is dimensioned so that some looseness or radial play (considered with reference to the substantially cylindrical plunger-receiving cavity 212, i.e. along a direction substantially transversal—for instance substantially perpendicular—to the first longitudinal axis X1) is formed between the plunger body 252 and an inner surface 215 of the plunger-receiving cavity 212. In the embodiment shown, the outer diameter d2 is between about 0.05 mm and about 0.5 mm smaller than the inner diameter d1. In some other embodiments, the outer diameter d2 is between about 0.1 mm and about 0.3 mm smaller than the inner diameter d1. In yet some other embodiments, the outer diameter d2 is between about 0.15 mm and about 0.25 mm smaller than the inner diameter d1.

In some embodiments, the outer diameter d2 is smaller than about 99% of the inner diameter d1. In some other embodiments, the outer diameter d2 is smaller than about 97% of the inner diameter d1. In some other embodiments, the outer diameter d2 is smaller than about 95% of the inner diameter d1. In yet some other embodiments, the outer diameter d2 is smaller than about 90% of the inner diameter d1.

In the embodiment shown, the plunger body 252 (or mobile pole body 252) comprises a substantially tapered end 253 conforming substantially to the bottom portion 213 of the plunger-receiving cavity 212. Moreover, as represented in FIG. 4, when the plunger body 252 is at least partially received in the plunger-receiving cavity 212, the plunger body 252 defines a distal end portion 249 protruding outwardly from the plunger-receiving cavity 212, and a proximal end portion 251 received in the plunger-receiving cavity 212. In other words, the plunger assembly 250 (or solenoid mobile pole 250) has a length lp, considered along the first longitudinal axis X1 of the plunger-receiving cavity 212, greater than a length lc of the plunger-receiving cavity 212, so that a portion of the plunger assembly 250 (comprising the distal end portion 249 of the plunger body 252 and the lever-mounting portion 254) protrudes outwardly from the plunger-receiving cavity 212 for the plunger assembly 250 to be connectable and/or engageable to other elements (to the vibration-transmitting lever 400, in the embodiment shown). In the embodiment shown, a length ld of the distal end portion 249, considered along the longitudinal direction of the plunger assembly 250 is less than about 70% of a length lb of the plunger body 252. In some other embodiments, the length ld of the distal end portion 249 is less than about 50% of the length lb of the plunger body 252. In some other embodiments, the length ld of the distal end portion 249 is less than about 30% of the length lb of the plunger body 252. In yet some other embodiments, the length ld of the distal end portion 249 is less than about 20% of the length lb of the plunger body 252.

In some embodiments, the length lb of the plunger body 252 (or mobile pole body) is smaller than about 95% of the length lp of the mobile pole 250. In some other embodiments, the length lb of the plunger body 252 (or mobile pole body) is smaller than about 90% of the length lp of the mobile pole 250. In some other embodiments, the length lb of the plunger body 252 (or mobile pole body) is smaller than about 85% of the length lp of the mobile pole 250. In yet some other embodiments, the length lb of the plunger body 252 (or mobile pole body) is smaller than about 80% of the length lp of the mobile pole 250.

In some embodiments, the length lc of the plunger-receiving cavity 212 (or mobile pole-receiving cavity 212) is smaller than about 95% of the length lb of the mobile pole body 252. In some other embodiments, the length lc of the plunger-receiving cavity 212 (or mobile pole-receiving cavity 212) is smaller than about 90% of the length lb of the mobile pole body 252. In some other embodiments, the length lc of the plunger-receiving cavity 212 (or mobile pole-receiving cavity 212) is smaller than about 85% of the length lb of the mobile pole body 252. In yet some other embodiments, the length lc of the plunger-receiving cavity 212 (or mobile pole-receiving cavity 212) is smaller than about 80% of the length lb of the mobile pole body 252.

It is understood that, due the substantial translation of the mobile pole 250 within the mobile pole-receiving cavity 212 upon actuation of the haptic solenoid assembly 200, the value of the length ld of the distal end portion 249 (and thus the ratio between the length ld of the distal end portion 249 and the length lb of the mobile pole body 252) also varies upon actuation of the haptic solenoid assembly 200.

As represented in FIG. 4, the lever-mounting portion 254 of the mobile pole 250 protrudes outwardly from the plunger-receiving cavity 212 when the plunger body 252 is at least partially received therein. In the embodiment shown, the lever-mounting portion 254 has a substantially cylindrical shape coaxial with the plunger body 252. As represented in FIG. 2, the lever-mounting portion 254 comprises two lever-mounting arms 256 spaced apart from each other and defining a lever-mounting slot 258 therebetween. Moreover, a pivot-receiving opening 260 (substantially circular, in the embodiment shown) is formed in each lever-mounting arm 256. The pivot-receiving openings 260 of the two lever-mounting arms 256 are in register with each other.

It is appreciated that the shape and the configuration of the plunger assembly 250 (or solenoid mobile pole 250, or movable solenoid member 250), and in particular the shape and the configuration of the plunger body 252 and the lever-mounting portion 254 can vary from the embodiment shown.

Mobile Pole-Guiding Bushing

The haptic solenoid assembly 200 further comprises a solenoid vibration-damping system 285 comprising at least a mobile pole-guiding bushing 280 (or guiding bushing 280 or rattling-limiting bushing 280, or solenoid vibrating-limiting bushing 280, or mobile pole radial restrictor 280).

In the embodiment shown, the mobile pole-guiding bushing 280 is engaged to the barrel 210 (or stationary pole 210), for instance to the casing 214 thereof, for instance to an outer face (with respect to the plunger-receiving cavity 212) thereof. In the embodiment show, the mobile pole-guiding bushing 280 is engaged to an outer face 217 (with respect to the plunger-receiving cavity 212) of the top wall 218. For instance, the mobile pole-guiding bushing 280 is glued to the barrel 210 (for instance to the casing 214 thereof) or secured to the barrel 210 (to the top wall 218 of the casing 214 thereof, in the embodiment shown) by any other suitable mechanical fasteners. As detailed below, the mobile pole-guiding bushing 280 might also be engaged indirectly to the barrel 210. In other words, in the embodiment shown, the guiding bushing 280 (or mobile pole-guiding bushing 280) extends outwardly from the plunger-receiving cavity 212.

A haptic solenoid assembly having a guiding bushing extending at least partially in the plunger-receiving cavity or extending at least partially in the plunger-receiving aperture formed in the top wall could also be conceived. Moreover, even though in the embodiment shown, the mobile pole-guiding bushing 280 and the housing 214 of the barrel 210 (or stationary pole 210) form two distinct elements, a haptic solenoid assembly in which the guiding bushing would be formed integral with at least a part of the housing—for instance in which the mobile pole-guiding bushing would also form at least partially the top wall of the housing—could also be conceived.

In the embodiment shown, the guiding bushing 280 has a plunger-receiving aperture 282 (or mobile pole-receiving aperture 282) formed therethrough. In the embodiment shown, the mobile pole-receiving aperture 282 has a substantially cylindrical shape in register with the plunger-receiving cavity 212 of the barrel 210, that is, substantially coaxial with the first longitudinal axis X1 of the plunger-receiving cavity 212, when the mobile pole-guiding bushing 280 is engaged to the barrel 214 in the embodiment in which the guiding bushing 280 and the barrel 214 form two distinct elements.

The plunger-receiving aperture 282 (or mobile pole-receiving aperture 282 or mobile pole-receiving through opening 282) has an inner cross-section d3 (an inner diameter d3, in the embodiment shown in which the plunger-receiving aperture 282 is substantially cylindrical) smaller than the inner cross-section d1 of the plunger-receiving cavity 212 (or inner diameter d1, in the embodiment shown in which the plunger-receiving cavity 212 is substantially cylindrical). Moreover, the inner-cross section d3 is slightly greater than the outer diameter d2 of the plunger body 252 (or mobile pole body 252), for the plunger body 252 (or at least for the distal end portion 249 of the plunger body 252 in the embodiment in which the mobile pole-guiding bushing 280 extends outwardly of the plunger-receiving cavity 212) to be engageable therein and substantially translatable therethrough. The ratio of the inner cross-section d3 of the plunger-receiving aperture 282 and the outer diameter d2 of the plunger body 212 is based on industry standards. It is understood that the present disclosure is not limited to a mobile pole-guiding bushing 280 having a plunger-receiving aperture 282 with a substantially cylindrical shape (i.e. with an inner surface 284 delimiting a substantially cylindrical aperture). For instance, a guiding bushing with a plunger-receiving aperture with protrusions extending from an inner surface thereof could be conceived, for the inner cross-section of the plunger-receiving aperture to be smaller than the inner cross-section of the plunger-receiving cavity.

As represented in FIG. 4, when the plunger body 252 (or mobile pole body 252) extends—or is at least partially received—in the mobile pole-receiving cavity 212 defined by the stationary pole 210, the mobile pole-guiding bushing 280 surrounds at least partially the distal end portion 249 of the plunger body 252 and is located proximate the lever-mounting portion 254 of the solenoid mobile pole 250. In other words, in the embodiment shown, the mobile pole-guiding bushing 280 extends between the lever-mounting portion 254 and the proximal end portion 251 of the mobile pole body 252.

The mobile pole-guiding bushing 280—or at least the inner surface 284 at least partially delimiting the mobile pole-receiving aperture 282 or mobile pole-receiving through opening 282 thereof—is formed at least partially in a material having low or reduced friction properties, such as, but without being limitative, Teflon™ or brass.

The mobile pole-guiding bushing 280 extends partially along the length lp of the plunger assembly 250 (or mobile pole 250). In the embodiment shown, a length l4 of the guiding bushing 280 considered along the first longitudinal axis X1 is greater than the outer diameter d2 of the plunger body 212. In an embodiment, the length l4 of the guiding bushing 280 is greater than about 120% of the outer diameter d2 of the plunger body 212. In another embodiment, the length l4 of the guiding bushing 280 is greater than about 150% of the outer diameter d2 of the plunger body 212. In another embodiment, the length l4 of the guiding bushing 280 is greater than about 200% of the outer diameter d2 of the plunger body 212. In another embodiment, the length l4 of the guiding bushing 280 is greater than about 300% of the outer diameter d2 of the plunger body 212. In another embodiment, the length l4 of the guiding bushing 280 is greater than about 400% of the outer diameter d2 of the plunger body 212. It could also be conceived a haptic solenoid assembly wherein the length of the guiding bushing would be smaller than the outer diameter of the plunger body.

The ratio of the length l4 of the guiding bushing 280 and the outer diameter d2 of the plunger body 212 is based on industry standards.

In an embodiment, the length l4 of the guiding bushing 280 is greater than about 5% of the length lp of the plunger assembly 250. In another embodiment, the length l4 is greater than about 10% of the length lp of the plunger assembly 250. In another embodiment, the length l4 is greater than about 15% of the length lp of the plunger assembly 250. In another embodiment, the length l4 is greater than about 20% of the length lp of the plunger assembly 250. In another embodiment, the length l4 is greater than about 40% of the length lp of the plunger assembly 250. In yet another embodiment, the length l4 is greater than about 50% of the length lp of the plunger assembly 250.

It is appreciated that the shape, the configuration, and the location of the mobile pole-guiding bushing 280 with regards to the plunger assembly 250 (or solenoid mobile pole 250) and the barrel 210 (or solenoid stationary pole 210), as well as the shape and the configuration of the mobile pole-receiving aperture 282 (or mobile pole-receiving through opening 282) can vary from the embodiment shown.

Solenoid Vibration Damper

The solenoid vibration-damping system 285 of the haptic solenoid assembly 200 further comprises a solenoid vibration damper 290.

In the embodiment shown, the solenoid vibration damper 290 is engaged to the barrel 210 (or solenoid stationary pole 210), for instance to the outer face of the casing thereof, for instance to the outer face 217 (with respect to the mobile pole-receiving cavity 212) of the top wall 218. For instance, the solenoid vibration damper 290 is glued to the solenoid stationary pole 210 or secured to the barrel 210 by any other suitable mechanical fasteners, such as adhesive layers. In another embodiment, the solenoid vibration damper 290 is molded or injected onto the outer face 217 of the top wall 218. In other words, the solenoid vibration damper 290 extends outwardly from the plunger-receiving cavity 212. A haptic solenoid assembly having a solenoid vibration damper extending at least partially in the plunger-receiving cavity or extending at least partially in the plunger-receiving aperture (or mobile pole-receiving aperture) formed in the top wall could also be conceived. Moreover, even though in the embodiment shown, the solenoid vibration damper 290 and the housing 214 of the barrel 210 form two distinct elements, a haptic solenoid assembly in which the solenoid vibration damper would be formed integral with at least a part of the housing thereof—for instance in which the solenoid vibration damper would also form at least partially the top wall of the housing—could also be conceived.

In the embodiment shown, the solenoid vibration damper 290 has a plunger-receiving aperture 292 (or guiding bushing-receiving aperture 292 or bushing-receiving aperture 292 or bushing-receiving through opening 292) with a substantially cylindrical shape, in register with the plunger-receiving cavity 212 of the barrel 210, that is, substantially coaxial with the first longitudinal axis X1 of the plunger-receiving cavity 212, when the solenoid vibration damper 290 is mounted to the barrel 214 in the embodiment in which the solenoid vibration damper 290 and the barrel 214 form two distinct elements.

In the embodiment shown, the plunger-receiving aperture 292 (or bushing-receiving through opening 292) has an inner cross-section d4 (an inner diameter d4, in the embodiment shown in which the plunger-receiving aperture 292 is substantially cylindrical) corresponding substantially to an outer cross-section d5 of the mobile pole-guiding bushing 280 (or an outer diameter d5 of the guiding bushing 280 in the embodiment in which, as represented, the mobile pole-guiding bushing 280 is substantially annular in shape). The guiding bushing 280 is thus at least partially snugly fitted into the plunger-receiving aperture 292 (or bushing-receiving aperture 292) of the solenoid vibration damper 290. The solenoid vibration damper 290 being secured (or fixed) to the barrel 210 (or directly molded or injected on an outer surface thereof, for instance to the outer face 217 of the top wall 218), the mobile pole-guiding bushing 280 is thus connected (for instance secured or fixed) to the barrel 210 via the solenoid vibration damper 290. In other words, the mobile pole-guiding bushing could be slightly displaced with regards to the stationary pole 210, the connection (possibly a flexible connection) between the mobile pole-guiding bushing 280 and the stationary pole 210 being ensured by the solenoid vibration damper 290.

An additional mechanical fastener (not represented) could be conceived to further secure the mobile pole-guiding bushing 280 into the plunger-receiving aperture 292 (or bushing-receiving aperture 292) of the solenoid vibration damper 290. The solenoid vibration damper 290 is thus dimensioned for the mobile pole-guiding bushing 280 to be at least partially received in the plunger-receiving aperture 292 (or bushing-receiving aperture 292) of the solenoid vibration damper 290. In other words, the solenoid vibration damper 290 forms a bushing-mounting damper 290 configured, in the embodiment shown, to substantially keep parallel the longitudinal axis of the guiding bushing 280 and the longitudinal axis of the plunger assembly 250 (or solenoid mobile pole 250). It is thus understood that the inner cross-section d4 of the plunger-receiving aperture 292 (the inner diameter d4, in the embodiment shown in which the plunger-receiving aperture 282 is substantially cylindrical) is greater than the outer diameter d2 of the plunger body 212, for the plunger body 252 (or at least for a portion of the distal end portion 249 of the plunger body 252 or mobile pole body 252) to be engageable therein (and substantially translatable therein). A haptic solenoid assembly in which the mobile pole-guiding bushing and the solenoid vibration damper would be configured in an axially adjacent configuration, considered along the first longitudinal axis of the plunger-receiving cavity could also be conceived. Moreover, in the embodiment shown, the length l4 of the mobile pole-guiding bushing 280 is greater than a length l5 of the solenoid vibration damper 290.

In some embodiments, the length l4 of the mobile pole-guiding bushing 280 is greater than about 110% of the length l5 of the solenoid vibration damper 290. In some other embodiments, the length l4 of the mobile pole-guiding bushing 280 is greater than about 120% of the length l5 of the solenoid vibration damper 290. In some other embodiments, the length l4 of the mobile pole-guiding bushing 280 is greater than about 140% of the length l5 of the solenoid vibration damper 290. In yet some other embodiments, the length l4 of the mobile pole-guiding bushing 280 is greater than about 160% of the length l5 of the solenoid vibration damper 290.

A haptic solenoid assembly in which the mobile pole-guiding bushing and the solenoid vibration damper would have a substantially equal length, or in which the solenoid vibration damper would be longer than the mobile pole-guiding bushing could also be conceived. The solenoid vibration damper 290 and the guiding bushing 280 form together at least partially the above-mentioned solenoid vibration-damping system 285.

The solenoid vibration damper 290 surrounds at least partially the plunger-receiving cavity 212. In the embodiment shown, the solenoid vibration damper 290 borders at least partially an outer periphery of the plunger-receiving aperture 219 formed in the top wall 218.

As represented in FIG. 4, when the plunger body 252 (or mobile pole body 252) extends in the plunger-receiving cavity 212 of the barrel 210, the solenoid vibration damper 290 surrounds at least partially the distal end portion 249 of the plunger body 252 and is located proximate the lever-mounting portion 254 of the solenoid mobile pole 250. In other words, in the embodiment shown, and similarly to the mobile pole-guiding bushing 280, the solenoid vibration damper 290 extends between the lever-mounting portion 254 and the proximal end portion 251 of the solenoid mobile pole 250.

The solenoid vibration damper 290 is formed at least partially in a material having flexibility and/or resilience and/or damping properties. For instance, and without being limitative, the solenoid vibration damper 290 is at least partially made of a rubbery material, such as rubber, silicon or neoprene having shore durometer in the range of about 10 A Shore to about 70 A Shore. In some other embodiments, the shore durometer of the material in which the solenoid vibration damper 290 is at least partially formed is comprised between about 20 A Shore to about 60 A Shore. In yet some other embodiments, the shore durometer of the material in which the solenoid vibration damper 290 is at least partially formed is comprised between about 30 A Shore to about 50 A Shore.

The solenoid vibration damper 290 extends partially along the length lp of the plunger assembly 250. In the embodiment shown, the length l5 of the solenoid vibration damper 290 is at least about 10% of the length l4 of the guiding bushing 280. In another embodiment, the length l5 of the solenoid vibration damper 290 is at least about 40% of the length l4 of the guiding bushing 280. In another embodiment, the solenoid vibration damper 290 extends substantially along the entire length l4 of the guiding bushing 280.

In another embodiment, the length l5 of the solenoid vibration damper 290 is at least about 5% of the length l of the plunger assembly 250. In another embodiment, the length l5 of the solenoid vibration damper 290 is at least about 10% of the length l of the plunger assembly 250. In another embodiment, the length l5 of the solenoid vibration damper 290 is at least about 15% of the length l of the plunger assembly 250. In yet another embodiment, the length l5 of the solenoid vibration damper 290 is at least about 20% of the length l of the plunger assembly 250.

It is appreciated that the shape, the configuration, and the location of the solenoid vibration damper 290 with regards to the plunger assembly 250—or solenoid mobile pole 250—and the barrel 210 (or solenoid stationary pole 210), as well as the shape and the configuration of the plunger-receiving aperture 292 can vary from the embodiment shown.

It should be noted that the term "surrounded", in particular when it refers to the mobile pole-receiving cavity 212 of the stationary pole 210 being at least partially surrounded by the mobile pole-guiding bushing 280 and/or the solenoid vibration damper 290 is not limited to embodiments in which the mobile pole-receiving cavity 212 and the mobile pole-guiding bushing 280 and/or the solenoid vibration damper 290 are at least partially coaxial, but also refers to embodiments (as in the embodiment shown) wherein the mobile pole-receiving cavity 212 and the mobile pole-guiding bushing 280 and/or the solenoid vibration damper 290 are at least partially axially offset (with regards to the first longitudinal axis X1). Moreover, the term "surrounded" is not limited to embodiments wherein an entirety of an outer periphery of a first component is surrounded by a second embodiment, but also refers to embodiments wherein only a portion of the outer periphery of the first component is surrounded by the second component.

Solenoid-Mounting Support

In the embodiment shown, the solenoid-mounting support 300 comprises, as represented in FIG. 2, a solenoid-mounting support base 302 mountable to the solenoid-mounting structure 10 (for instance mountable to the solenoid-mounting apertures 14 formed in the mounting plate 12 of the solenoid-mounting structure 10), and first and second solenoid-mounting plates 304, 306 spaced apart from each other, extending substantially parallel to each other (substantially vertically, in the embodiment shown) and defining a stationary pole-receiving cavity 308 therebetween.

In the embodiment shown, the barrel 210 is mounted to the first and second solenoid-mounting plates 304, 306. For instance the bottom wall 216 and the top wall 218 of the housing 214 of the barrel 210 could be mounted respectively to the first and second solenoid-mounting plates 304, 306.

It is appreciated that the shape, the configuration, and the location of the solenoid-mounting support 300 with regards to the solenoid-mounting structure 10 and the haptic solenoid assembly 200 can vary from the embodiment shown.

Vibration-Transmitting Lever or Haptic Vibration Lever

As represented in FIGS. 2 and 3, the vibration-transmitting lever 400 (or lever 400 or haptic vibration lever) extends along a second longitudinal axis X2 and comprises a solenoid-mounting end portion 410 pivotably mounted to the lever-mounting portion 254 of the plunger assembly 250 (or solenoid mobile pole 250) about a first pivot axis R1. In the embodiment shown, the solenoid-mounting end portion 410 is received in the lever-mounting slot 258 formed between the lever-mounting arms 256 of the lever-mounting portion 254. In the embodiment shown, the first pivot axis R1 is substantially vertical and is substantially perpendicular to the second longitudinal axis X2 and to the first longitudinal axis X1. The first pivot axis R1 is aligned with the pivot-receiving openings 260 formed in the lever-mounting arms 256.

The vibration-transmitting lever 400 further comprises an opposed vibrating end portion 420 engageable to the mobile piece 20 (i.e. to the vibrated member 20) (for instance via the screen-driving member 30 or driving member 30).

It is understood that the mobile pole 250 is engageable to the vibrated member 20 via the vibration-transmitting lever 400. It is thus understood that the term "engageable" used in the present description is not limited to embodiments wherein components are directly engageable to each other, but also includes embodiments wherein components are indirectly engageable to each other (as for the mobile pole 250 being engageable to the vibrated member 20 via the vibration-transmitting lever 400, or as for the vibration transmitting lever 400 being engageable to the vibrated member via the screen-driving member 30).

In the embodiment shown, the screen-driving member 30 (or vibrated member-supporting piece 30) comprises an upper supporting surface 32 (or screen-supporting surface 32 or vibrated member-supporting surface 32 or upper mounting surface 32) and an abutting portion 34 (or screen-abutting portion 34) protruding upwardly from the upper supporting surface 32 and configured, as represented in FIG. 1, to abut against at least a portion of a peripheral edge 21 of the mobile piece 20 (or vibrated member 20).

The vibration-transmitting lever 400 is further pivotably mounted to the solenoid mounting structure 10 about a second pivot axis R2 (FIG. 3), extending substantially vertically in the embodiment shown (for instance extending substantially parallel to the first pivot axis R1).

The vibration-transmitting lever 400 is mounted to the solenoid mounting structure 10 via the lever-mounting support 50 of the vibration-transmitting member 40.

In the embodiment shown, the lever-mounting support 50 has a lever-mounting base 52 mountable to the solenoid-mounting structure 10 (for instance securable to the mounting apertures 14 formed in the solenoid-mounting plate 12 so as to protrude upwardly from the upper face 13 of the mounting plate 12) and a lever-receiving portion 54 defining a lever-receiving cavity 55 in which at least a portion of the vibration-transmitting lever 400 (at least a portion of the vibrating end portion 420 thereof, in the embodiment shown) can be received.

Moreover, as represented in FIG. 2, adjustment openings 53—or stopper-receiving apertures 53 (three, in the embodiment shown) are formed in a peripheral wall 57 of the lever-receiving portion 54 in which vibration adjusters 59 (or lever stoppers 59) are introduced. The vibration adjusters 59—or lever stoppers 59—(for instance and without being limitative spring plungers) are displaceable within the corresponding adjustment opening 53—or stopper-receiving aperture 53—for a free end of the vibration adjusters to cooperate with a portion of the vibration-transmitting lever 400 (for instance with a portion of the vibrating end portion 420 thereof) received in the lever receiving cavity 55 formed in the lever-receiving portion 54 of the lever-mounting support 50. For instance, the peripheral wall 57 presents a plane of symmetry extending substantially perpendicular to the longitudinal direction of the vibration-transmitting lever 400 and comprising the second pivot axis R2, first and second ones of the adjustment openings 53—or stopper-receiving apertures—being located on each side of the plane of symmetry.

The vibration-transmitting lever 400, and more particularly the vibrating end portion 420 thereof, comprises a vibrated member-connecting portion 421 connectable (or securable) to the driving member 30 (or screen-supporting member 30), and thus indirectly connectable—or engageable—to the vibrated member 20. The vibrated member-connecting portion 421 of the vibration-transmitting lever 400 is spaced apart from the second pivot axis X2, so that, by pivoting the vibration-transmitting lever 400 about the second pivot axis R2, the driving member 30 (or screen-supporting member 30) is displaceable with regards to the solenoid-mounting plate 12. Thus, by pivoting the vibration-transmitting lever 400 about the second pivot axis R2, the vibrated member 20 is also displaceable—or vibrable—with regards to the solenoid-mounting plate 12.

Figure 7:
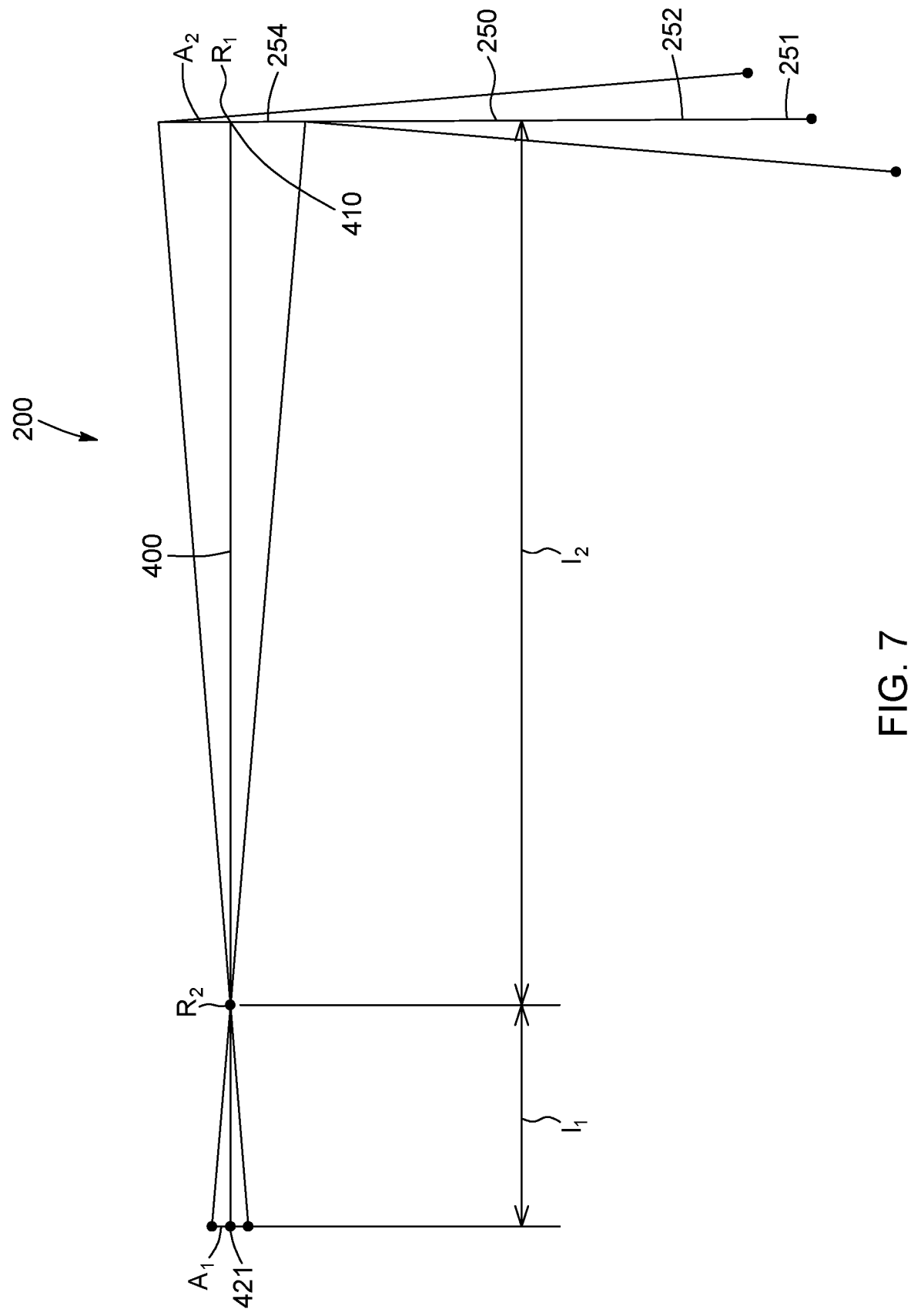
FIG. 7 is a schematic view of the motions of the vibration-transmitting lever and the mobile pole of a haptic solenoid assembly in accordance with an embodiment.

In the embodiment shown, the first and second pivot axes R1, R2 are substantially parallel to each other. For instance, the first and second pivot axes R1, R2 both extend substantially perpendicularly to the second longitudinal axis X2 of the vibration-transmitting lever 400 and/or perpendicularly to the first longitudinal axis X1. It is understood that, in the embodiment shown, and as schematically represented for instance in FIG. 7, the second pivot axis R2 is fixed with regards to the solenoid-mounting structure 10, whereas the first pivot axis R1 is displaceable with regards to the solenoid-mounting structure 10, when the haptic solenoid assembly 200 is actuated (i.e. when an electric current is provided to the coil 230 of the stationary pole 210 of the haptic solenoid assembly 200). For clarity purposes, numeral references in FIG. 7 are only represented for a position of the haptic solenoid assembly 200 when no current is provided to the coil 230 (i.e. when the haptic solenoid assembly 200 is not actuated).

In the embodiment shown, a distance I1, considered along the second longitudinal direction X2 of the vibration-transmitting lever 400 and as represented in FIG. 3, between the vibrated member-connecting portion 421 of the vibration-transmitting lever 400 connected to the screen-driving member 30 and the second pivot axis R2, is smaller than a distance I2 between the second pivot axis R2 and the portion of the vibration-transmitting lever 400 connected to the solenoid 200 (i.e. the distance I2 between the second pivos axis R2 and the solenoid-mounting end portion 410 of the vibration-transmitting lever 400, i.e. the distance I2 between the first and second pivot axes R1, R2, in the embodiment shown).

For instance and without being limitative, the ratio of the distance I1:I2 is greater than or equal to about 1:2. In some embodiments, the ratio of the distance I1:I2 is greater than or equal to about 1:4. In some other embodiments, the ratio of the distance I1:I2 is greater than or equal to about 1:5.

It is appreciated that the shape and the configuration of the screen-driving member 30 and the lever-mounting support 50 forming together the vibration-transmitting member 40 can vary from the embodiment shown. Moreover, it is appreciated that the shape and the configuration of the vibration-transmitting lever 400, as well as the location of the lever 400 with regards to the haptic solenoid assembly 200 and the vibrated member 20 can vary from the embodiment shown.

Lever Vibration Dampers

The haptic solenoid assembly 200 further comprises lever vibration dampers 450 (two, in the embodiment shown—FIG. 3).

The lever vibration dampers 450 are mounted to the vibration-transmitting lever 400, at the vibrating end portion 420 thereof. In the embodiment shown, the lever vibration dampers 450 are mounted to an upper surface 422 of the vibrating end portion 420, proximate the second pivot axis R2. For instance and without being limitative, at least one of the lever vibration dampers 450 is mounted proximate the vibrated member-connecting portion 421 of the vibration-transmitting lever 600, for instance between the vibrated member-connecting portion 421 and the second pivot axis R2.

For instance, the second pivot axis R2 extends between the two lever vibration dampers 450. In the embodiment shown, the lever vibration dampers 450 are at distances l5, l6 of the second pivot axis R2, as represented in FIG. 3, being smaller than about 50% of a length l3 of the vibration-transmitting lever 400. In some embodiments, the distances l5, l6 are smaller than about 30% of the length l3. In some other embodiments, the distances l5, l6 are smaller than about 20% of the length l3. In yet some other embodiments, the distances l5, l6 are smaller than about 15% of the length l3. In the embodiment shown, the two lever vibration dampers 450 are at a substantially identical distance from the second pivot axis R2.

In some embodiments, the distances l5, l6 are smaller than about 95% of the length l1 between the vibrated member-connecting portion 421 of the vibration-transmitting lever 400 connected to the screen-driving member 30 and the second pivot axis R2. In some other embodiments, the distances l5, l6 are smaller than about 85% of the length l1. In some other embodiments, the distances l5, l6 are smaller than about 75% of the length l1. In yet some other embodiments, the distances l5, l6 are smaller than about 50% of the length l1.

The lever vibration dampers 450 are formed at least partially in a material having flexibility and/or resilience and/or damping properties. For instance, and without being limitative, the lever vibration dampers 450 are at least partially made of a rubbery material, such as rubber, silicon or neoprene. In an embodiment, the lever vibration dampers 450 are at least partially made from silicone rubber, with a shore durometer comprised between about 5 A Shore and about 50 A Shore. In some other embodiments, the shore durometer of at least one of the lever vibration dampers 450 is comprised between about 10 A Shore and about 30 A Shore. In some other embodiments, the shore durometer of at least one of the lever vibration dampers 450 is comprised between about 15 A Shore and about 25 A Shore.

In an embodiment, the lever vibration dampers 450 are substantially parallelepipedal in shape and have dimensions of about 2 mm×about 3 mm×about 0.5 mm.

It is appreciated that the shape, the number and the configuration of the lever vibration dampers 450, as well as the location of the lever vibration dampers 450 with regards to the lever 400, can vary from the embodiment shown.

Motions of the Haptic Solenoid System

It is thus understood that, when the plunger assembly 250—or mobile pole 250—is at least partially received within the plunger-receiving cavity 212 of the barrel 210 (or solenoid stationary pole 210), a current being provided to the coil 230 (i.e. when the haptic solenoid assembly 200 is actuated), the plunger body 252 is displaced within the plunger-receiving cavity 212.

As represented in FIG. 7, since the plunger assembly 250 is pivotally mounted to the vibration-transmitting lever 400 (at their respective lever-mounting portion 254 and solenoid-mounting end portion 410), the lever-mounting end portion 254 follows a path A2 when the plunger body 252 is displaced in the plunger-receiving cavity 212 upon actuation of the solenoid 200. In the embodiment shown, the haptic solenoid assembly 200 is dimensioned for the path A2 to have a length comprised between about 0.01 mm and about 5 mm. In some other embodiments, the haptic solenoid assembly 200 is dimensioned for the path A2 to have a length comprised between about 0.02 mm and about 3 mm. In yet some other embodiments, the haptic solenoid assembly 200 is dimensioned for the path A2 to have a length comprised between about 0.1 mm and about 2 mm.

The displacement of the plunger body 252 in the plunger-receiving cavity 212 further pivots the vibration-transmitting lever 400 about the second pivot axis R2 and thus displaces the vibrating end portion 420 thereof. The vibration-transmitting lever 400 being connected to the vibration-transmitting member 40 via the vibrated member-connecting portion 421 of the vibration-transmitting lever 400 that is rotatably mounted to the lever-mounting support 50 of the vibration-transmitting member 40, the screen-driving member 30, and thus the vibrated member 20, are displaced and/or vibrated. In the embodiment shown, the screen-driving member 30 and the vibrated member 20 at least partially supported thereby are displaced in a plane substantially perpendicular to the first and second pivot axes R1, R2 and substantially parallel to (for instant not comprising) the second longitudinal axis X2 of the vibration-transmitting lever 400 (i.e. in a plane substantially to the first plane P1). In other words, by being pivotally mounted to the solenoid-mounting structure 10 about the second pivot axis R2, the vibration-transmitting lever 400 is configured so that the movements of the solenoid-mounting end portion 410 of the vibration-transmitting lever 400 along the path A2 displace the vibrating end portion 420 along a path A1, as represented in FIG. 7. In the embodiment shown, the path A1 is substantially arc-shaped. In other words, the vibrations created by the solenoid mobile pole 250 upon actuation of the haptic solenoid assembly 200 can be transmitted to the vibrated member 20 via the vibration-transmitting lever 400 and the vibration-transmitting member 40. In other words, the vibration-transmitting member 400 and the vibration-transmitting member 40 are used to transmit vibrations from the mobile pole 250 to the vibrated member 20 upon actuation of the haptic solenoid assembly 200. In yet other words, the vibration-transmitting lever 400 forms a transmission member configured to transmit amplified vibrations of the movable solenoid member 250 upon actuation of the haptic solenoid assembly 200.

The vibration-transmitting lever 400 is dimensioned so that the above-described distances l1, l2 defined respectively between the portion of the lever 400 connected to the driving member 30 (i.e. the vibrated member-connecting portion 421 of the vibration-transmitting lever 400) and the second pivot axis R2 and between the first and second pivot axes R1, R2 allow a displacement of the screen-driving member 30 smaller than the displacement of the lever-mounting portion 254 when the haptic solenoid assembly 200 is actuated. In the embodiment shown, as mentioned above, the displacement of the screen-driving member 30 follows the path A1. In some embodiments, the path A1 has a length smaller than the length of the path A2 followed by the lever-mounting end portion 254. In some other embodiments, the length of the path A1 is at least 2 times smaller than the displacement of the lever-mounting end portion 254 along the path A2. In some other embodiments, the length of the path A1 is at least 4 times smaller than the displacement of the lever-mounting end portion 254 along the path A2. In some other embodiments, the length of the path A1 is at least 5 times smaller than the displacement of the lever-mounting end portion 254 along the path A2. In some embodiments, the length of the path A1 is comprised between about 0.005 mm and about 0.5 mm.

The above-described vibration adjusters—or lever stoppers—extending in the adjustment through-openings 53 (stopper-receiving apertures or stopper-receiving through openings) can be displaced therein for their free-end to be displaced with regards to the vibration-transmitting lever 400. The vibration adjusters—or lever stoppers—are thus configured to adjust the displacement of the vibration end portion 420 of the lever 400 along the path A1 within the lever-receiving cavity 55 formed in the lever-mounting support 50, thus adjusting the displacement of the lever-mounting end portion 254 of the plunger assembly 250 along the path A2.

The haptic solenoid system 100 is also configured to convert a longer displacement of the lever-mounting end portion 254 compared to the displacement of the vibrating end portion 420 of the vibration-transmitting lever 400 into a higher force applied to the vibrated member 20, so as to allow a displacement of mobile pieces having a significant weight (for instance up to or greater than 500 g).

Technical Effects of the Mobile Pole-Guiding Bushing and/or the Lever Vibration Dampers and/or the Solenoid Vibration Damper As represented in FIG. 7, when the haptic solenoid assembly 200 is actuated (i.e. when a current is provided to the coil 230 thereof), the constraint applied by the vibration-transmitting lever 400 to the plunger assembly 250—or mobile pole 250—via the lever-mounting end portion 254 might radially displace at least a portion of the plunger body 250 within the plunger-receiving cavity 212 (at least a portion of the proximal end portion 251 thereof, in the embodiment shown). The plunger body 250 might thus hit back and forth the inner surface 215 at least partially delimiting the plunger-receiving cavity 212. Such a repetitive contact of the plunger body 250 with the inner surface 215 might generate rattling and thus nuisance to the user.

The inner cross-section d3 of the mobile pole-guiding bushing 280 being smaller than the inner cross-section d1 of the plunger-receiving cavity 212, the mobile pole-guiding bushing 280 of the solenoid vibration-damping system 285 limits the radial displacement of the plunger body 250 within the plunger-receiving cavity 212, and thus limit such rattling. In other words, the mobile pole-guiding bushing 280 (or rattling limiting bushing or vibrating limiting bushing) allows a flexible mounting of the plunger assembly 250 within the plunger-receiving cavity 212 formed in the barrel 210 and allows a smoother displacement of the plunger assembly 250. Moreover, the material and design implementation of the solenoid vibration-damping system 285 comprising at least one of the guiding bushing 280 and the solenoid vibration damper 290 are chosen so that the contact of the plunger assembly 250 with the inner surface 284 at least partially delimiting the plunger-receiving aperture 282 formed in the guiding bushing 280 will not generate significant friction or jamming.

It is thus understood that the solenoid vibration damping system 285 comprising at least one of the guiding bushing 280 and the solenoid vibration damper 290 (or bushing-mounting damper 290) allows to substantially keep parallel the longitudinal axis of the mobile pole-guiding bushing 280 and the longitudinal axis of the plunger assembly 250 while allowing these longitudinal axes to become substantially non-coincidental during the actuation of the haptic solenoid assembly 200.

Moreover, the solenoid vibration damper 290 is configured so that in case at least a portion of the plunger assembly 250, and more particularly in case at least a portion of the proximal end portion 251 of the plunger body 252 would hit the inner surface 215 at least partially delimiting the plunger-receiving cavity 212, the solenoid vibration damper 290 will limit the formation of sounds and their diffusion in the haptic solenoid system 100, so as to limit the audible impact of the contact (i.e. so as to limit the risk of rattling of the plunger assembly 250 in the plunger-receiving cavity 212 formed in the barrel 210).

The lever vibration dampers 450 also contribute to limiting rattling and/or noise of the haptic solenoid system 100, when the haptic solenoid assembly 200 is actuated and when the different components of the haptic solenoid system 100 are set in motion.

The vibration dampers of the present disclosure, comprising the solenoid vibration damper 290 and the lever vibration dampers 450, thus act as noise dampeners (or acoustic dampeners) and limit the risk that the haptic solenoid system 100 according to the present disclosure make click noise or rattling, without jeopardizing the efficiency of the haptic solenoid system 100, in terms of displacement of the vibrated member 20.

It is thus understood that the haptic solenoid system 100 according to the present disclosure could efficiently be part of a haptic system configured to displace a screen so as to provide touch/sensory feedback to a user when a virtual button is depressed on the screen.

Several alternative embodiments and examples have been described and illustrated herein. The embodiments of the invention described above are intended to be exemplary only. A person of ordinary skill in the art would appreciate the features of the individual embodiments, and the possible combinations and variations of the components. A person of ordinary skill in the art would further appreciate that any of the embodiments could be provided in any combination with the other embodiments disclosed herein. It is understood that the invention may be embodied in other specific forms without departing from the central characteristics thereof. The present examples and embodiments, therefore, are to be considered in all respects as illustrative and not restrictive, and the invention is not to be limited to the details given herein. Accordingly, while the specific embodiments have been illustrated and described, numerous modifications come to mind. The scope of the invention is therefore intended to be limited by the scope of the appended claims.

What is claimed is:

1. A haptic solenoid assembly for transmission of amplified vibrations to a vibrated member, the haptic solenoid assembly comprising:
   a stationary pole comprising a casing defining a plunger-receiving cavity opening out in the casing and a coil at least partially surrounding the plunger-receiving cavity;

a mobile pole comprising:
- a mobile pole body at least partially received in the plunger-receiving cavity and displaceable radially and longitudinally therein when an electric current is provided to the coil; and
- a lever-mounting portion protruding outwardly from the plunger-receiving cavity and engageable to the vibrated member; and a solenoid vibration-damping system engaged to the stationary pole and at least partially surrounding the plunger-receiving cavity, the solenoid vibration-damping system comprising a mobile pole radial restrictor having a plunger-receiving aperture formed therethrough in register with the plunger-receiving cavity to limit a radial displacement of the mobile pole body within the plunger-receiving cavity.

2. The haptic solenoid assembly according to claim 1, wherein the mobile pole radial restrictor is engaged to the casing of the stationary pole.

3. The haptic solenoid assembly according to claim 1, wherein the plunger-receiving aperture has an inner cross-section smaller than an inner cross-section of the plunger-receiving cavity.

4. The haptic solenoid assembly according to claim 1, wherein the solenoid vibration-damping system comprises a solenoid vibration damper with a bushing-receiving aperture formed therethrough, the solenoid vibration damper being engaged to the casing and surrounding at least partially the plunger-receiving cavity, the mobile pole radial restrictor being at least partially snugly fitted into the bushing-receiving aperture.

5. The haptic solenoid assembly according to claim 1, further comprising a vibration-transmitting lever having:
- a solenoid-mounting end portion pivotably mounted to the lever-mounting portion of the mobile pole about a first pivot axis; and
- an opposed vibrating end portion engageable to the vibrated member.

6. The haptic solenoid assembly according to claim 5, wherein the stationary pole is mountable to a solenoid-mounting structure, the vibrating end portion of the vibration-transmitting lever being pivotably mountable to the solenoid-mounting structure about a second pivot axis, the first and second pivot axes being substantially parallel to each other.

7. The haptic solenoid assembly according to claim 6, further comprising one or more lever vibration dampers proximate one of the first and second pivot axes.

8. A haptic solenoid system comprising:
- a haptic solenoid assembly according to claim 1; and
- a vibration-transmitting member connected to the lever-mounting end portion of the mobile pole and engageable to the vibrated member.

9. The haptic solenoid system according to claim 8, wherein the haptic solenoid assembly further comprises a vibration-transmitting lever comprising:
- a solenoid-mounting end portion pivotably mounted to the lever-mounting portion of the mobile pole about a first pivot axis; and
- an opposed vibrating end portion pivotably connected to the vibration-transmitting member about a second pivot axis substantially parallel to the first pivot axis.

10. The haptic solenoid system according to claim 9, wherein the stationary pole is mountable to a solenoid-mounting structure, and wherein the vibration-transmitting member comprises:
- a screen-driving member engageable to the vibrated member; and
- a lever-mounting support mountable to the solenoid-mounting structure and comprising a lever-receiving portion defining a lever-receiving cavity, the vibrating end portion of the vibration-transmitting lever being at least partially received in the lever-receiving cavity.

11. The haptic solenoid system according to claim 10, wherein the lever-receiving portion comprises an inner surface at least partially delimiting the lever-receiving cavity, one or more lever stoppers protruding inwardly from the inner surface.

12. The haptic solenoid system according to claim 11, wherein said one or more lever stoppers are engaged into stopper-receiving apertures formed in the lever-receiving portion and are displaceable within the corresponding stopper-receiving aperture from an outside of the lever-receiving cavity.

13. The haptic solenoid system according to claim 8, wherein the solenoid vibration-damping system of the haptic solenoid assembly comprises a plunger-guiding bushing engaged to the casing of the stationary pole and having a plunger-receiving aperture formed therethrough in register with the plunger-receiving cavity.

14. A haptic solenoid assembly for transmission of amplified vibrations to a vibrated member, the haptic solenoid assembly comprising:
- a solenoid barrel forming a stationary pole and comprising:
  - a casing defining a plunger-receiving cavity opening out in the casing; and
  - a coil at least partially surrounding the plunger-receiving cavity;
- a mobile pole comprising:
  - a plunger body at least partially received in the plunger-receiving cavity and displaceable radially and longitudinally therein when an electric current is provided to the coil, and
  - a lever-mounting portion protruding from the plunger body outwardly from the plunger-receiving cavity and engageable to the vibrated member; and
- a plunger-guiding bushing engaged to an outer surface of the casing and having a plunger-receiving aperture formed therethrough and being in register with the plunger-receiving cavity of the solenoid barrel, wherein the mobile pole is longitudinally displaceable within the plunger-receiving aperture of the plunger-guiding bushing upon actuation of the haptic solenoid assembly and wherein the plunger-guiding bushing limits a radial displacement of the plunger body within the plunger-receiving cavity.

15. The haptic solenoid assembly according to claim 14, further comprising a solenoid vibration damper with a bushing-receiving aperture formed therethrough, the solenoid vibration damper being engaged to the casing and surrounding at least partially the plunger-receiving cavity, the plunger-guiding bushing being at least partially snugly fitted into the bushing-receiving aperture.

16. The haptic solenoid assembly according to claim 15, wherein a length of the plunger-guiding bushing is greater than a length of the solenoid vibration damper.

17. The haptic solenoid assembly according to claim 16, further comprising a vibration-transmitting lever having:
- a solenoid-mounting end portion pivotably mounted to the lever-mounting portion of the mobile pole about a first pivot axis; and an opposed vibrating end portion engageable to the vibrated member.

18. A haptic solenoid assembly for transmission of amplified vibrations to a vibrated member, the haptic solenoid assembly comprising:
 a stationary pole comprising:
  a casing defining a plunger-receiving cavity opening out in the casing, and
  a coil at least partially surrounding the plunger-receiving cavity;
 a mobile pole comprising:
  a mobile pole body extending at least partially in the plunger-receiving cavity and displaceable radially and longitudinally therein when an electric current is provided to the coil, and
  a lever-mounting portion protruding outwardly from the plunger-receiving cavity; and
 a vibration-transmitting lever comprising:
  a solenoid-mounting end portion pivotably mounted to the lever-mounting portion of the mobile pole about a first pivot axis; and
  an opposed vibrating end portion engageable to the vibrated member; and
 a mobile pole radial restrictor engaged to the casing and having a plunger-receiving aperture formed therethrough in register with the plunger-receiving cavity;
 wherein the mobile pole radial restrictor limits a radial displacement of the mobile pole body within the plunger-receiving cavity upon actuation of the haptic solenoid assembly; and
 wherein a path of the lever-mounting portion is substantially arc-shaped upon actuation of the haptic solenoid assembly.

19. The haptic solenoid assembly according to claim 18, wherein the stationary pole is mountable to a solenoid-mounting structure, wherein the vibrating end portion of the vibration-transmitting lever is pivotably mountable to the solenoid-mounting structure about a second pivot axis, the first and second pivot axes being substantially parallel to each other.

20. The haptic solenoid assembly according to claim 19, wherein the vibrating end portion comprises a vibrated member-connecting portion engageable to the vibrated member, wherein a first distance is defined between the vibrated member-connecting portion and the second pivot axis, and a second distance is defined between the first and second pivot axes, the first distance being smaller than the second distance, for the vibrated member-connecting portion to follow a path smaller than a path followed by the solenoid-mounting end portion of the vibration transmitting lever upon actuation of the haptic solenoid assembly.

* * * * *

UNITED STATES PATENT AND TRADEMARK OFFICE
CERTIFICATE OF CORRECTION

| | |
|---|---|
| PATENT NO. | : 11,652,394 B2 |
| APPLICATION NO. | : 16/692366 |
| DATED | : May 16, 2023 |
| INVENTOR(S) | : Olien et al. |

It is certified that error appears in the above-identified patent and that said Letters Patent is hereby corrected as shown below:

On the Title Page

On Page 2, Column 1, Item (51), under "Int. Cl.", Line 2, delete "*H02K 5/22    (2006.01)*".

In the Specification

In Column 16, Line 55, delete "pivos" and insert -- pivot --, therefor.

In the Claims

In Column 23, Claim 18, Line 17, after "cavity;" delete "and".

Signed and Sealed this
Twentieth Day of June, 2023

Katherine Kelly Vidal
*Director of the United States Patent and Trademark Office*